(12) United States Patent
Wang et al.

(10) Patent No.: US 12,357,927 B2
(45) Date of Patent: Jul. 15, 2025

(54) DATE SEED POWDER FOR WATER FILTRATION TREATMENT

(71) Applicant: SAUDI ARABIAN OIL COMPANY, Dhahran (SA)

(72) Inventors: Qiwei Wang, Dhahran (SA); Ali Al-Tawfiq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 32 days.

(21) Appl. No.: 18/449,496

(22) Filed: Aug. 14, 2023

(65) Prior Publication Data

US 2023/0381690 A1 Nov. 30, 2023

Related U.S. Application Data

(62) Division of application No. 17/332,370, filed on May 27, 2021, now Pat. No. 11,772,016.

(51) Int. Cl.
 *B01D 24/10* (2006.01)
 *B01D 24/00* (2006.01)
 (Continued)

(52) U.S. Cl.
 CPC ......... *B01D 24/105* (2013.01); *B01D 24/007* (2013.01); *B01D 24/16* (2013.01);
 (Continued)

(58) Field of Classification Search
 CPC .... B01D 24/105; B01D 24/007; B01D 24/16; B01D 24/4631; B01D 2101/00; C02F 1/004; C02F 1/286; C02F 2303/16
 See application file for complete search history.

(56) References Cited

U.S. PATENT DOCUMENTS 5,259,972 A 11/1993 Miyamaru et al.
7,497,947 B2 3/2009 Knighton et al.
(Continued)

FOREIGN PATENT DOCUMENTS

CN 103071463 A 5/2013
CN 107159144 A 9/2017
(Continued)

OTHER PUBLICATIONS

Mahdi, Z., Yu, Q.J. and El Hanandeh, A., 2018. Removal of lead (II) from aqueous solution using date seed-derived biochar: batch and column studies. Applied Water Science, 8, pp. 1-13 (Year: 2018).*
(Continued)

*Primary Examiner* — Magali P Slawski
*Assistant Examiner* — Bernadette Karen McGann
(74) *Attorney, Agent, or Firm* — Bracewell LLP; Constance G. Rhebergen; Eleanor T. Porter

(57) ABSTRACT

Systems and methods for generating and using a water filtration media containing date seed powder are provided. The method of generating the date seed powder for use in a water treatment system includes drying the date seeds, cleaning and removing the date seed envelopes, grinding the date seeds, and segregating the date seed powder according to a predetermined particle size. The method of using the date seed powder to treat water includes using a treatment tank with a date seed media bed layer, introducing water, and filtering suspended solids from the water stream using the date seed media bed layer. The system utilizing the date seed media bed layer includes a treatment tank, a date seed media bed layer, water inlets and outlets, backwashing equipment, and media support screens.

9 Claims, 3 Drawing Sheets

(51) Int. Cl.
*B01D 24/16* (2006.01)
*B01D 24/46* (2006.01)
*C02F 1/00* (2023.01)
*C02F 1/28* (2023.01)

(52) U.S. Cl.
CPC .......... *B01D 24/4631* (2013.01); *C02F 1/004* (2013.01); *C02F 1/286* (2013.01); *B01D 2101/00* (2013.01); *C02F 2303/16* (2013.01)

(56) References Cited

U.S. PATENT DOCUMENTS

| | | | |
|---|---|---|---|
| 7,553,418 | B2 | 6/2009 | Khudenko et al. |
| 8,747,667 | B2 | 6/2014 | Felch et al. |
| 10,259,725 | B2 | 4/2019 | Alkendi et al. |
| 10,259,982 | B2 | 4/2019 | Amanullah |
| 10,336,930 | B2 | 7/2019 | Amanullah |
| 2012/0111797 | A1 | 5/2012 | Lavoie |
| 2016/0101991 | A1 | 4/2016 | Long |
| 2016/0312100 | A1 | 10/2016 | Amanullah et al. |
| 2017/0334742 | A1 | 1/2017 | Lisle et al. |
| 2018/0099237 | A1* | 4/2018 | Silverwood .......... B01D 24/008 |
| 2019/0059670 | A1 | 2/2019 | Schultink et al. |

FOREIGN PATENT DOCUMENTS

| | | |
|---|---|---|
| CN | 107335409 A | 11/2017 |
| CN | 110681371 A | 1/2020 |
| GB | 2388557 A | 11/2003 |
| WO | 2012067588 A1 | 5/2012 |

OTHER PUBLICATIONS

Thompson, K.A., Shimabuku, K.K., Kearns, J.P., Knappe, D.R., Summers, R.S. and Cook, S.M., 2016. Environmental comparison of biochar and activated carbon for tertiary wastewater treatment. Environmental science & technology, 50(20), pp. 11253-11262 (Year: 2016).*

Daniel, V.V., Gulyani, B.B. and Prakash Kumar, B.G., 2012. Usage of date stones as adsorbents: a review. Journal of Dispersion science and Technology, 33(9), pp. 1321-1331 (Year: 2012).*

Bouchelta, C., Medjram, M.S., Bertrand, O. and Bellat, J.P., 2008. Preparation and characterization of activated carbon from date stones by physical activation with steam. Journal of Analytical and Applied Pyrolysis, 82(1), pp. 70-77 (Year: 2008).*

Girgis, B.S. and El-Hendawy, A.N.A., 2002. Porosity development in activated carbons obtained from date pits under chemical activation with phosphoric acid. Microporous and mesoporous materials, 52(2), pp. 105-117 (Year: 2002).*

El-Naas, M.H., Al-Zuhair, S. and Alhaija, M.A., 2010. Reduction of COD in refinery wastewater through absorption on date-pit activated carbon. Journal of hazardous materials, 173(1-3), pp. 750-757 (Year; 2010).*

Bouchelta, C., Medjram, M.S., Betrand, O. and Bellat, J.P., 2008. Preparation and characterization of activated carbon from date stones by physical activation with steam. Journal of Analytical and Applied Pyrolysis, 82(1), pp. 70-77 (Year: 2008).*

Azeem et al., "Production of biodiesel from low priced, renewable and abundant date seed oil", Renewable Energy 86, 2016, pp. 124-132.

Ogungbenro et al., "Activated Carbon from Date Seeds for CO2 Capture Applications", Energy Procedia, 114, 2017, pp. 2313-2321.

Riahi, et al., Date-palm fibers media filters as a potential technology for tertiary domestic wastewater treatment, Journal of Hazardous Materials 161 (2009), pp. 608-613.

Shafiq, et al., Removal of Heavy Metals from Wastewater using Date Palm as a biosorbent: A Comparative Review, Sains Malaysiana 47.1 (2018), pp. 35-49.

Yousuf et al., "Waste date seed oil extract as an alternative feedstock for Poly(3-hydroxybutyrate) synthesis", Biochemical Engineering Journal, 127, 2017, pp. 68-76.

* cited by examiner

DATE SEED POWDER FOR WATER FILTRATION TREATMENT

PRIORITY

The present application is a divisional application of U.S. patent application Ser. No. 17/332,370, filed on May 27, 2021, the entire disclosure of which is incorporated here by reference.

FIELD

This disclosure relates to methods and systems for water filtration. More specifically, this disclosure relates to methods and systems for producing and utilizing a filtration media generated from date seeds.

BACKGROUND

Filtration is commonly used in water and wastewater treatment systems to remove suspended solids. It is often one of many steps required to meet wastewater effluent or water quality standards, or to prepare the water for use in industrial systems. Filtration systems can use a filter media in a filter bed. Conventional filter media includes anthracite, garnet, magnetite, glass beads, walnut shells, granular PVC, activated carbon, and silica sand. Some filter beds are made of uniform materials, while some filter beds comprise layers of multiple media types in a mixed media filtration system. Mixed media filtration systems are often layered strategically so that larger media components are layered at the top, underlain by smaller sizes, allowing the largest suspended solid particles to be retained in the top layers while smaller suspended solid particles are retained in the lower layers, thus improving filtration efficiency and increasing filter run time before cleaning or backwashing. Backwashing or other cleaning procedures, though, can disrupt the layers of the filter bed resulting in a mixed mono-layer. Therefore, filter media must be selected carefully to account for particle size, particle size distribution, density, and compatibility.

Date seeds are a byproduct of date fruit (*Phoenix dactylifera*) production. Date seeds are generally considered a waste product. Only small quantities of date seeds are used in animal feed, fiber supplements for baked goods, or other dietary uses. Global yield of date fruit is about 8.46 million metric tons per year. The date seed constitutes about 10 to 18% of the total weight of the date fruit, thus resulting annually in over a million tons of date seeds generated and often wasted around the world.

Therefore, a way of utilizing the unused date seeds in industrial applications is desired. Additionally, methods and systems to generate filtration bed media that is compatible with water treatment systems is also desirous.

SUMMARY

This disclosure relates to methods for producing filter bed media for water treatment systems from date seeds, and methods and systems for using the date seed media in a water treatment system. More specifically, this disclosure relates to the steps to process date seeds to generate a date seed media, and methods of using the date seed media to remove suspended solids from a water stream. The date seed media is generated by drying, cleaning, removing a date seed membrane, grinding, selecting a particle size for the date seed media, and segregating the particulates by size to generate the desired sized date seed media. The date seed media is used in a filter bed water treatment system, either single media or multi-media. The date seed media is also used in a method to treat water by removing suspended solids. The water is introduced to a treatment tank with the date seed filter media and allowed to drain through the media bed so that suspended solids become trapped in the filter media. Treated water is then generated from the outlet of the system.

Therefore, disclosed is a method of treating water by filtration. The method includes the step of providing a date seed media in a treatment tank, where the date seed media contains processed date seeds and has a date seed density, so that the date seed media forms a data seed media bed layer which operates to remove suspended solids. The method also includes introducing a water stream to the treatment tank so that the water stream flows through the date seed media bed layer. The water stream includes suspended solids and has a suspended solids content. The method also includes filtering the water stream with the date seed media bed layer, accumulating suspended solids in the date seed media bed layer, and generating a treated water stream from the treatment tank. The treated water stream has a treated suspended solids content less than the suspended solids content of the water stream.

In some embodiments, the method further includes the step of selecting a predetermined particle size of the date seed media, so that the predetermined particle size allows the date seed media to accumulate suspended solids in the date seed media bed layer so that the treated suspended solids content is less than a target level. In further embodiments, the predetermined particle size of the date seed media is selected based upon a target size of suspended solids within the water stream.

In some embodiments, the method also includes the steps of determining a filter operation criterion after which a filter efficiency drops below an acceptable limit, introducing a backwash stream to the treatment tank after the filter operation criterion has been triggered, which operates to agitate the date seed media bed layer to remove trapped suspended solids within the date seed media bed layer, and removing a backwash outlet stream from the treatment tank. In further embodiments, the backwash stream includes water, and in some embodiments, compressed air.

In some embodiments, the method also includes the step of filtering the water stream through an alternate media bed layer, and accumulating suspended solids in the alternate media bed layer. In further embodiments, the alternate media bed layer includes an alternate media with an alternate media density greater than a date seed media density, so that the date seed media bed layer is positioned above the alternate media bed layer after backwashing in the absence of support between media bed layers. In some further embodiments, the date seed media has a predetermined particle size greater than an alternate media particle size, so that when the date seed media bed layer is positioned above the alternate media bed layer, larger suspended solids are accumulated in the date seed media bed layer. Smaller suspended solids pass through the date seed media layer and are accumulated in the alternate media bed layer.

In some embodiments, the method step of introducing the water stream to the treatment tank is performed to allow a downward flow of fluid through the date seed media bed layer with the assistance of gravity. In other embodiments, the method step of introducing the water stream to the treatment tank is performed utilizing pressure to allow an upward flow of fluid through the date seed media bed layer. In some embodiments, the date seed media adsorbs certain water contaminants.

Further disclosed is a system for water treatment, the system including the treatment tank configured to hold water, a water stream inlet which operates to allow the water stream to enter the treatment tank, and the date seed media bed layer positioned within the treatment tank which operates to filter the water stream by removing suspended solids. The date seed media bed layer includes the date seed media. The system also includes a media support screen positioned within the treatment tank which operates to retain the date seed media bed layer, and a treated water stream outlet which operates to allow the treated water stream to exit the treatment tank. In some embodiments, the system further includes a backwash stream which operates to backwash the date seed media bed layer after a filter operation criterion has been triggered, and a backwash outlet stream which operates to remove water and debris generated during backwash from the backwash stream.

In some embodiments, the system further includes the alternate media bed layer. The alternate media bed layer can include the alternate media selected from the group of anthracite, quartz, sand, garnet, magnetite, glass beads, walnut shell, granular polyvinylchloride (PVC), silica, and combinations of the same.

Further disclosed is a method for producing a water filtration media. The method includes the steps of drying an unprocessed date seed to generate a dried date seed, cleaning the dried date seed so that minimal debris is on a surface of the dried date seed, removing a date seed membrane from the dried date seed to generate a date seed mass, grinding the date seed mass in a grinder to generate a date seed powder, selecting the predetermined particle size proportional to a suspended solids content in the water stream where the predetermine particle size operates to accumulate suspended solids from the water stream within the date seed powder when the water stream is treated, and segregating the date seed powder according to the predetermined particle size to generate the date seed media, so that the date seed media operates to treat the water stream through filtration.

In some embodiments, the step of segregating the date seed powder according to the predetermined particle size is performed by sieving the date seed powder in graduated sieves. The step of selecting the predetermined particle size also includes selecting the predetermined particle size to allow the suspended solids to penetrate the date seed media bed layer an optimum distance. In some embodiments, the steps of cleaning the dried date seed and removing the date seed membrane are performed using a shaker. In some embodiments, the method is performed in an absence of chemicals.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

Figure 1:
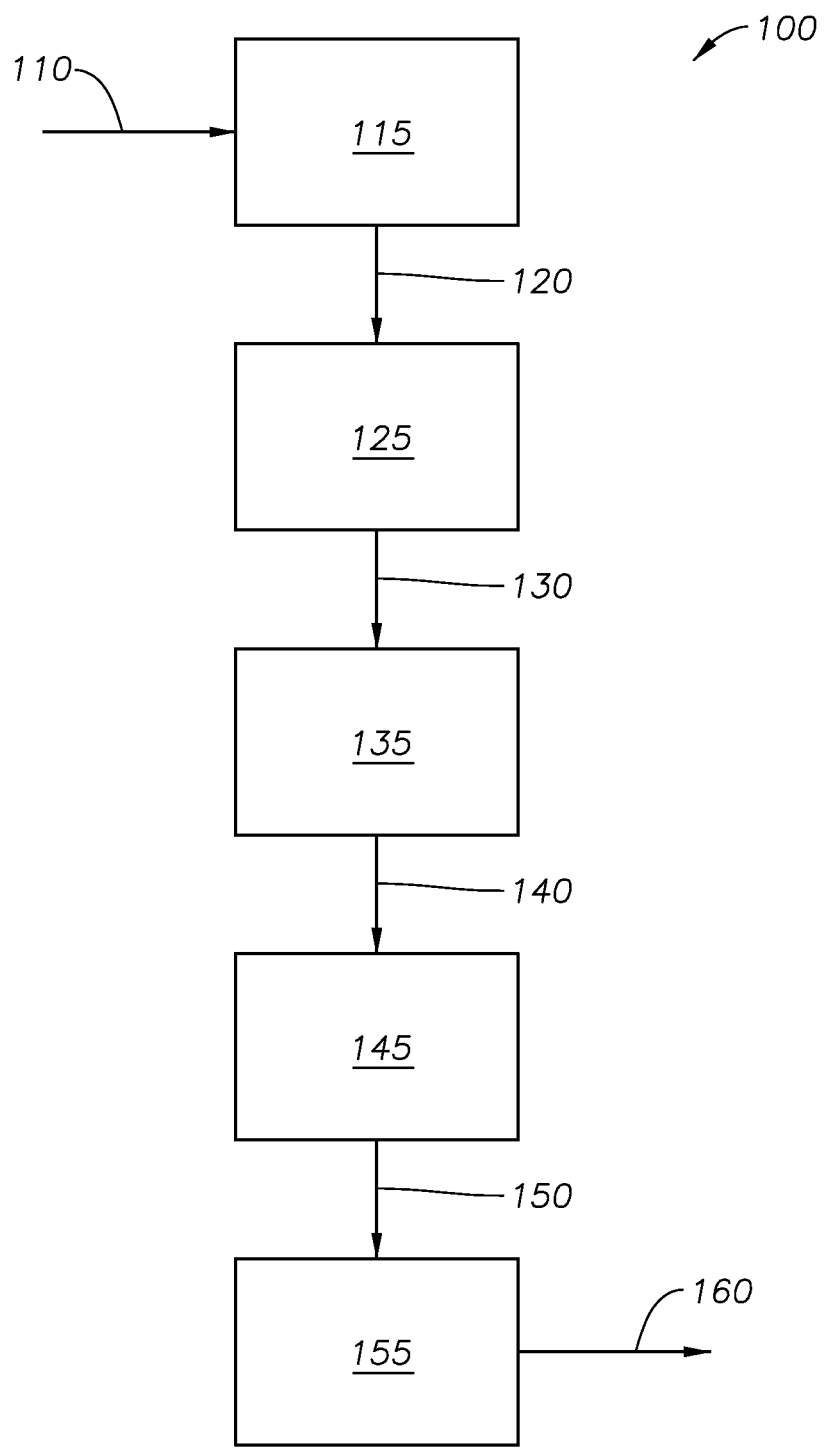
FIG. 1 provides a flowchart of the steps to generate the date seed filter media, according to an embodiment.

In the accompanying Figures, similar components or features, or both, may have a similar reference label. For the purpose of the simplified schematic illustrations and descriptions of FIGS. 1 through 5, the numerous pumps, valves, temperature and pressure sensors, electronic controllers, and the like that can be employed and well known to those of ordinary skill in the art are not included. Further, accompanying components that are in conventional industrial operations are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

Advantageously, the embodiments disclosed herein solve many problems. The embodiments disclosed herein reduce water pollution by removing suspended solids in water streams. Additionally, the date seed media uses a waste product from date production and generates a useable filtration media that is low-cost, plentiful, natural, and efficient, thereby reducing landfill waste. Advantageously, date seeds are widely available in certain areas of the world, including the Middle East, North America, and parts of Asia and Africa. Date seeds are generally considered a waste product as they are generated in far greater quantities than what can be used as animal feed or food supplements, and are therefore extremely cost-effective to obtain. Since the date seed media is chemically untreated, there is no concern regarding chemicals leeching into treated water, or safety concerns during processing. At the end of the date seed media lifespan, the waste generated is biodegradable. By utilizing date seeds that would become waste, the present invention provides an environmentally friendly solution that reduces waste, is biodegradable, is cost-effective, and provides better filtration for water treatment than conventional filtration media.

The date seed media has additional advantages when used for the treatment of water. The density of the date seed media, even when fully hydrated, is beneficially lower than other types of media often used in water treatment filtration beds, such as anthracite, sand, and garnet. A filtration media with lower density can result in more efficient backwashing as the media is more easily agitated. Additionally, when the date seed media is utilized in a mixed media filtration system with material more dense than the date seed media, the date seed media will naturally maintain its position above the other materials in the filtration system without the use of additional media retention screens. The lower density of the date seed media also allows larger, less dense particles of date seed media to be positioned in the filtration system above smaller, more dense particles of other material such as sand or garnet. This positioning improves efficiency as the top layer of date seed media can remove larger sized solids from the water stream without clogging the bottom layer of material, allowing for deeper and more uniform penetration by particulate matter. This increases efficiency, permits higher filtration rates, and increases the length of runs of the filtration system between servicing and backwashing.

Referring now to the figures, FIG. 1 is a flow diagram of date seed media production 100. Date seed media production 100 can include a variety of steps in various orders. Date seed media production 100 does not involve chemicals to process the date seed, and processing occurs in the absence of any chemical addition, such as bleach, caustic, pH modifiers, or other chemicals that would cause a chemical reaction to occur. Unprocessed date seed 110 undergoes drying 115. Unprocessed date seed 110 can be any type of date seed in any condition where the date seed has been removed from the date fruit. In a preferred embodiment, unprocessed date seed 110 is collected from the fruit of the *Phoenix dactylifera*, or date palm, plant. Any cultivar of the date palm can be used. Drying 115 can be performed by any method known or discovered in the art, including drying in the sun or applying heat. Any type of heater capable of providing consistent, controlled heating can be used. In preferred embodiments, the heat is controlled so that the inner chemical compounds within the date seeds are not altered, destroyed, volatized, chemically altered, or removed by high temperatures. In some embodiments, an electrical heater with a controlled temperature system is utilized to provide consistent, low-temperature heat to dry unprocessed date seed 110. In some embodiments, drying 115 is performed by arranging unprocessed date seed 110 in the sun for three days. Dried date seed 120 is generated from drying 115.

Dried date seed 120 undergoes cleaning 125. Cleaning 125 can include removing dried pieces of date fruit, dirt or dust, and other debris from the surface of the date seed, which are disposed of. Cleaning 125 can be performed by any method know or discovered in the art, including by a shaker. In some embodiments, clean water is used to clean dried date seed 120. Cleaned date seed 130 is generated from cleaning 125. Cleaned date seed 130 undergoes removing seed membrane 135. During the step of removing seed membrane 135 the qitmeer, or outer seed membrane, of each date seed is removed. The qitmeer is a thin membrane on the outer surface of the date seed that acts as a seed envelope. Removing seed membrane 135 can be performed by any method known or discovered in the art, including by a shaker. In some embodiments, electrical vibrating shakers are used to remove the qitmeer. The removed qitmeer can be disposed. Removing seed membrane 135 generates date seed mass 140.

The steps of drying 115, cleaning 125, and removing seed membrane 135 can be performed in different orders. In some embodiments, the step of removing seed membrane 135 can be performed before or during cleaning 125.

Date seed mass 140 undergoes grinding 145. Grinding 145 can be performed by any type of grinding mechanism or method known or discovered in the art, including using a heavy duty grinding mill. In some embodiments, a grinder capable of grinding date seed mass 140 is used. In preferred embodiments, a grinder is used that can produce the required different grades of the date seeds from coarse to fine with high grinding precision. Grinding 145 generates date seed powder 150. In a preferred embodiment, date seed powder 150 is a rounded shape, as sharp and angular powders can be inefficient as a filter media and remove less fine solid particles from the water stream.

Date seed powder 150 undergoes segregating 155, which generates date seed media 160. Segregating 155 can be performed by any type of segregating mechanism known or discovered in the art, including graduated sieves. The sieves can include wire mesh sieves, perforated plate sieves, or any other type of sieve. In some embodiments, multiple sieves are laid in series, consisting of a US standard #10 mesh sieve (with a sieve opening of 2 mm), US standard #16 mesh sieve (with a sieve opening of 1.19 mm), US standard #30 mesh sieve (with a sieve opening of 0.595 mm), and US standard #50 mesh sieve (with a sieve opening of 0.297 mm).

In some embodiments, date seed media 160 is classified by effective particle size. Effective particle size is the size at which approximately 10 wt % of the total grains are smaller, and therefore at which size approximately 90 wt % are larger. In some embodiments, date seed media 160 can be rated by size uniformity. Uniformity is a comparison of the effective size to the medium size. The medium size is the size at which 50 wt % of the grains are smaller than the effective size. The uniformity coefficient is the ratio of medium size to effective size. In a preferred embodiment, the uniformity coefficient is about 2 or less. The predetermined particle size of date seed media 160 can be the effective particle size.

In some embodiments, the predetermined particle size for date seed media 160 is the effective particle size selected based on the suspended solids content in the water stream and the effluent quality requirement in the treated water stream. The predetermined particle size can also be partially or fully based on the filtration system design. The predetermined particle size for date seed media 160 can be selected based on the target size of the suspended solids within the water stream, such as the average or effective sizes of the suspended solids in the water stream, so that suspended solids in the water stream get trapped between the grains of date seed media 160 and attach to date seed media 160. An analysis of the water stream being treated can identify the suspended solids particulate sizes present. The water stream analysis can be performed using approved analytical techniques known in the art, such as mesh or wired sieving, gravitational sedimentation, microscopic analysis, and laser analysis. Using this analysis, and the required water quality standards for suspended solids in the final treated water, the predominant particle size for the date seed media can be selected. During the treatment, as the suspended particles are unable to follow the tortuous channels generated by date seed media 160 within the date seed media bed layer, the suspended solids particles are retained and accumulate within the date seed media bed layer. In some embodiments, the predetermined particle size for date seed media 160 is based upon the target level of suspended solids in the treated water stream. In some embodiments, the predetermined particle size for date seed media 160 is based upon the suspended solids content in the water stream being treated. In some preferred embodiments, the predetermined particle size for date seed media 160 is selected so that the suspended solids in the water stream are able to penetrate the filter bed media to an optimum distance, for example, at least 3 inches, in order to delay a rapid increase in the pressure drop over the filter bed.

Date seed media 160, when fully hydrated, has a density that is in the range of 0.8 g/mL to 1.5 g/mL, alternately in the range of 1.0 g/mL to 1.4 g/mL, alternately in the range of 1.2 g/ml to 1.3 g/mL, and alternately 1.26 g/mL. Example densities of date seed media 160 compared to example densities of other types of commonly used filtration media are shown below in Table 1:

TABLE 1

Example Densities of Filtration Media

| Media type | Density (g/mL) |
|---|---|
| Date seed | 1.26 |
| Anthracite | 1.51 |
| Quartz sand | 2.65 |
| Garnet | 3.93 |

In some embodiments, described further below, the predetermined particle size of date seed media 160 is selected based partially upon the particle size of the other media layers in the filtration systems. When date seed media 160 is used in a multi-media filtration system, due to the lower density of the date seed, the predetermined particle size of date seed media 160 can be larger than the particle size of the other media layers and still be positioned above the lower, denser media layers.

Figure 2:
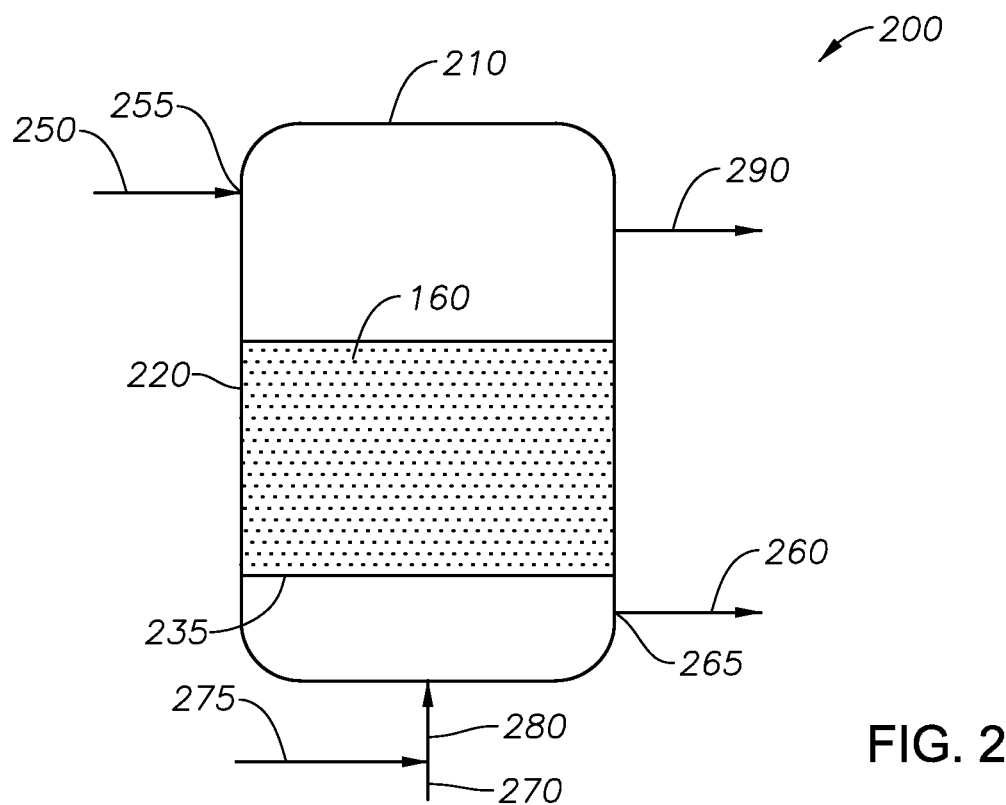
FIG. 2 provides a diagram of a water treatment system with date seed media bed layer, in accordance with another embodiment.

Referring to FIG. 2, water treatment system with date seed media bed layer 200 is shown. Water treatment system with date seed media bed layer 200 includes treatment tank 210, date seed media bed layer 220, and media support screen 235. Treatment tank 210 can be any type of tank or vessel operable to hold water. Date seed media bed layer 220 is made of date seed media 160 of a bed thickness appropriate to treat water stream 250. In some embodiments, date seed media bed layer 220 is at least 6 inches deep, alternately at least 8 inches deep, alternately at least 12 inches deep, alternately at least 20 inches deep, alternately at least 24 inches deep, and alternately 30 inches deep. In some embodiments, date seed media bed layer 220 is in the range of 6 inches to 36 inches, alternately 8 inches to 30 inches, and alternately 12 inches to 24 inches. Media support screen 235 can be any type of screen or support that provides support to or otherwise retains the media bed layers, with apertures to allow water to flow through to prevent the media from traversing media support screen 235.

Water stream 250 is introduced through water stream inlet 255 into treatment tank 210. Water stream 250 can be any type of water stream that contains suspended solids. Water from water stream 250 travels downward through date seed media bed layer 220 by gravity, and suspended solids from water stream 250 accumulate within date seed media bed layer 220. Due to the unique chemical and physical structure of date seed media 160, filtration capabilities are greatly enhanced. In some embodiments, the variable particle size of date seed media 160 in date seed media bed layer 220 contributes extensively towards the filtration capabilities and mechanisms. In some embodiments, due to the unique structure of the ground date seeds and the chemical and physical properties of the ground date seed media, including the microscopic surface area making up the physical structure of exterior of each grain of date seed media 160, date seed media 160 adsorbs water contaminants, such as metals and biological materials, found within water stream 250. The water contaminants accumulate within date seed media bed layer 220. Advantageously, the presences of chemically active polar functional groups such as alcohols, phenolic hydroxides, and ethers found in date seed media 160 allows for metals and other water contaminants to be easily adsorbed onto the surface area of the individual particulates of date seed media 160, and assists in the breakdown of biological materials. After passing through date seed media bed layer 220, the water passes through media support screen 235 and exits treatment tank 210 through treated water stream outlet 265, generating treated water stream 260. Treated water stream 260 has a lower suspended solids content than water stream 250.

Treatment tank 210 also contains backwash elements. Backwash water stream 270 and backwash air stream 275 combine to form backwash stream 280, which is provided to the bottom of treatment tank 210. Backwash stream 280 is used to backwash treatment tank 210 and date seed media bed layer 220. After a predetermined filter operation criterion is triggered, backwashing of the treatment tank 210 and date seed media bed layer 220 can occur. The predetermined filter operation criterion can include a predetermined period of time, an efficiency decline, a pressure increase, a decline in water quality, a water level increase, or other indicators, and combinations of the same. During backwashing, treated water stream 260 is prevented from leaving treatment tank 210. Water stream 250 can be prevented from entering treatment tank 210. Water, air, or both can be provided via backwash water stream 270 or backwash air stream 275, and through backwash stream 280 for the purposes of backwashing. Backwashing agitates date seed media 160, removing the accumulated suspended solids within date seed media bed layer 220. Backwash air stream 275 advantageously assists in the fluidization of date seed media bed layer 220, increasing agitation of date seed media 160, resulting in an enhanced removal of trapped solid particles, while simultaneously reducing the amount of backwash water stream 270 utilized during backwashing. Backwash outlet stream 290 exits treatment tank 210 and contains a higher suspended solids content than water stream 250 and backwash stream 280.

Figure 3:
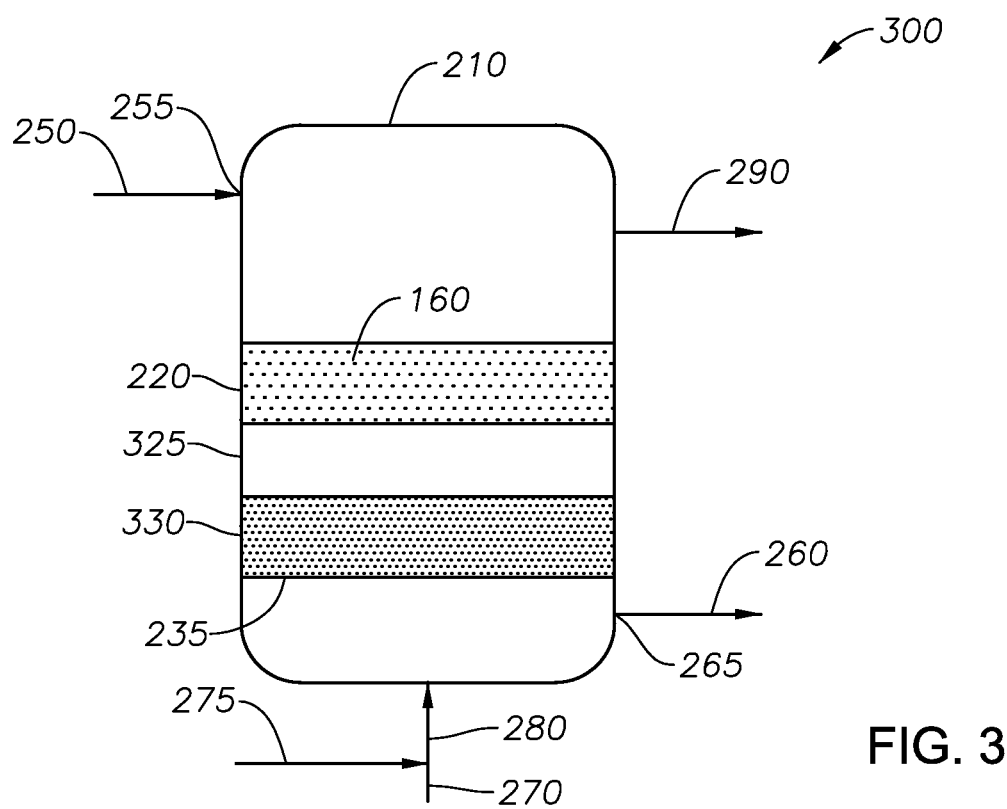
FIG. 3 provides a diagram of a water treatment system with multiple bed layers, in accordance with another embodiment.

Referring to FIG. 3, water treatment system with multiple bed layers 300 is shown, and shares many of the same elements as water treatment system with date seed media bed layer 200. Water treatment system with multiple bed layers 300 includes date seed media bed layer 220 is made of date seed media 160, and additionally includes first alternate media bed layer 325 and second alternate media bed layer 330. In some embodiments, date seed media bed layer 220 includes a second media mixed with date seed media 160, such as crushed anthracite. Due to the similar densities of anthracite and date seed, the combination of the two materials can be beneficial. The mix of anthracite and the date seed media enhance the output filtration capacity. As the date seed media is extremely cost effective to produce and install, and has a similar density to anthracite, the addition of date seed to the anthracite reduces cost significantly while providing the same output filtration capacity and results of the anthracite alone. In some embodiments, treatment tank 210 includes only date seed media bed layer 220 and first alternate media bed layer 325. In some embodiments, additional alternate media layers are provided. In some embodiments, one or more alternate media layers are provided above date seed media 160. First alternate media bed layer 325 and second alternate media bed layer 330 can include the alternate media such as anthracite, quartz, sand, garnet, magnetite, glass beads, walnut shell, granular polyvinylchloride, silica, activated glass, Desolidex, Acti Desolidex, activated carbon, Maddox, Depathex, or similar components, and combinations of the same. The alternate media can have the alternate media density greater than the date seed media density, so that when backwashing of treatment tank 210 is complete, date seed media bed layer 220 is positioned above first alternate media bed layer 325 and second alternate media bed layer 330.

The predetermine particle size of date seed media 160 can be greater than the alternate media predetermined particle size, so that when date seed media bed layer 220 is positioned above first alternate media bed layer 325 and second alternate media bed layer 330, larger suspended solid particles in water stream 250 accumulate in date seed media bed layer 220 while smaller suspended solid particles in water stream 250 pass through date seed media bed layer 220, but are accumulated in first alternate media bed layer 325 and second alternate media bed layer 330. Advantageously, this allows for greater efficiency of suspended solids removal while increasing run time of the filter and treatment system between backwashing.

In some embodiments, first alternate media bed layer 325 contains quartz sand and the second alternate media bed layer 330 contains garnet. In some embodiments, the predetermined particle size of data seed media 160 is in the range of 0.8 mm to 2.0 mm, alternately 1.0 mm to 1.8 mm, and alternately 1.2 mm to 1.6 mm. In some embodiments, the first alternate media predetermined particle size of the quartz sand in first alternate media bed layer 325 is smaller than the predetermined particle size of date seed media 160, and in the range of 0.4 mm to 1.0 mm, and alternately 0.5 mm to 0.8 mm. In some embodiments, the second alternate media predetermined particle size of the garnet in second alternate media bed layer 330 is smaller than the predetermined particle size of date seed media 160 and smaller than the first alternate media predetermined particle size of the quartz sand, and in the range of 0.2 mm to 0.6 mm, alternately in the range of 0.3 mm to 0.5 mm. The reduction in particle size of the media through the lower media layers allows for the largest suspended solids to be retained in the upper layers, while smaller particulates are trapped in the lower layers, improving filtration efficiency and increasing run time between backwash cycles. Due to the differences in density, filtration systems with these layers of media will naturally stratify back into the appropriate layers after backwashing, even in the absence of a system such as an alternate media support or screen separating the bed layers.

Figure 4:
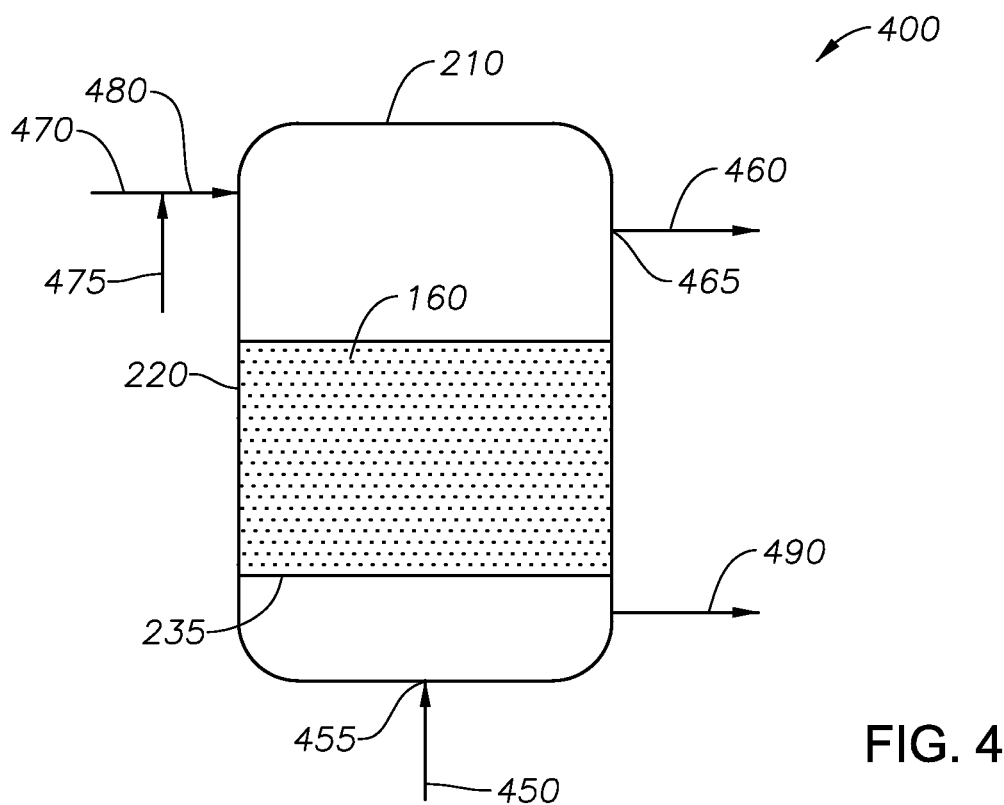
FIG. 4 provides a diagram of an upward flow water treatment system with date seed media bed layer, in accordance with another embodiment.

Referring to FIG. 4, upward flow water treatment system with date seed media bed layer 400 is shown, and shares many of the same features as water treatment system with date seed media bed layer 200. Advantageously, having an upward flow of water through the filtration system enhances the filtration capacity by letting the denser polluting particles settle and be removed further down into the bed layer. Upward flow water stream 450 is introduced to a lower portion of treatment tank 210 under pressure. Upward flow water stream 450 can have the same or similar characteristics to water stream 250. Upward flow water stream 450 has a water head (or pressure) great enough to push the water through treatment tank 210, which may be provided by water pumps, elevation differences, or other ways of increasing water head. Upward flow water stream inlet 455 allows upward flow water stream 450 to enter treatment tank 210. Water flows upward through date seed media bed layer 220, allowing suspended solids from the water to accumulate and get trapped within date seed media bed layer 220. Upward flow treated water stream 460 is removed from treatment tank 210 through upward flow treated water stream outlet 465.

During backwashing, upward flow backwash water stream 470 and upward flow backwash air stream 475 are provided near the top of treatment tank 210 through upward flow backwash stream 480. Upward flow backwash outlet stream 490 is removed from near the bottom of treatment tank 210 so that the backwash can thoroughly agitate and wash the entirety of date seed media bed layer 220.

Figure 5:
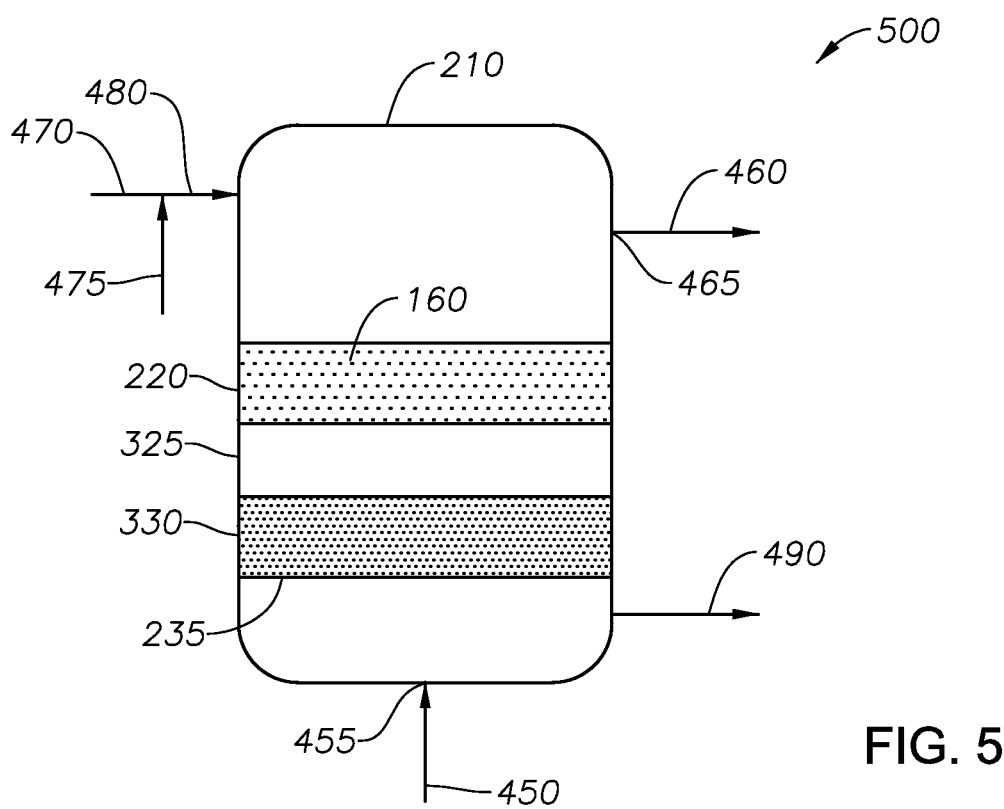
FIG. 5 provides a diagram of an upward flow water treatment system with multiple bed layers, in accordance with another embodiment.

Referring to FIG. 5, upward flow water treatment system with multiple bed layers 500 is shown, and shares many of the same or similar features as water treatment system with multiple bed layers 300 and upward flow water treatment system with date seed media bed layer 400. Backwash processes for upward flow water treatment system with multiple bed layers 500 is backwashed similarly to upward flow water treatment system with date seed media bed layer 400, and shares many of the advantages of water treatment system with multiple bed layers 300.

Although the present disclosure has been described in detail, it should be understood that various changes, substitutions, and alterations can be made without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise.

As used in the specification and in the appended claims, the words "has," and "include" and all grammatical variations thereof are each intended to have an open, non-limiting meaning that does not exclude additional elements or steps.

Ranges may be expressed throughout as from about one particular value, or to about another particular value. When such a range is expressed, it is to be understood that another embodiment is from the one particular value or to the other particular value, along with all combinations within said range.

What is claimed is:

1. A system for water treatment, the system comprising:
a treatment tank configured to hold water;
a water stream inlet, operable to allow a water stream to enter the treatment tank;
a date seed media bed layer positioned within the treatment tank, operable to filter the water stream by removing suspended solids, the date seed media bed layer comprising a date seed media, wherein the date seed media comprises date seed powder, wherein the date seed media is prepared in a date seed media product system, the date seed media product system comprising:
 a dryer operable to dry unprocessed date seed to produce dried date seed;
 a shaker operable to clean and remove a seed membrane from the dried date seed to produce date seed mass;
 a heavy duty grinding mill operable to grind the date seed mass to generate the date seed powder; and
 one or more segregating mechanism operable to segregate the date seed powder based on particle size to produce the date seed media;
a media support screen positioned within the treatment tank, operable to retain the date seed media bed layer; and
a treated water stream outlet, operable to allow a treated water stream to exit the treatment tank.

2. The system of claim 1, further comprising:
a backwash stream provided to the bottom of the treatment tank, operable to backwash the date seed media bed layer after a filter operation criterion has been triggered; and
a backwash outlet stream, operable to remove water and debris generated during backwash from the backwash stream.

3. The system of claim 1, further comprising an alternate media bed layer.

4. The system of claim 3, wherein the alternate media bed layer is comprised of an alternate media selected from the group consisting of: anthracite; quartz; sand; garnet; magnetite; glass beads; walnut shell; granular polyvinylchloride; silica; and combinations of the same.

5. A method of producing a water filtration media, the method comprising the steps of:
- drying an unprocessed date seed to generate a dried date seed;
- cleaning the dried date seed, such that minimal debris is on a surface of the dried date seed;
- removing a date seed membrane from the dried date seed to generate a date seed mass;
- grinding the date seed mass in a grinder to generate a date seed powder;
- selecting a predetermined particle size proportional to a suspended solids content in a water stream, the predetermined particle size operable to accumulate suspended solids from the water stream within the date seed powder when the water stream is treated; and
- segregating the date seed powder according to the predetermined particle size to generate a date seed media, such that the date seed media is operable to treat the water stream through filtration.

6. The method of claim 5, wherein the step of segregating the date seed powder according to the predetermined particle size to generate the date seed media is performed by sieving the date seed powder in graduated sieves.

7. The method of claim 5, wherein the step of selecting the predetermined particle size further comprises selecting the predetermined particle size to allow the suspended solids to penetrate the date seed media bed layer an optimum distance.

8. The method of claim 5, wherein the steps of cleaning the dried date seed and removing the date seed membrane are performed using a shaker.

9. The method of claim 5, wherein the method is performed with an absence of chemicals.

* * * * *